United States Patent [19]

Senft et al.

[11] Patent Number: 4,840,385

[45] Date of Patent: Jun. 20, 1989

[54] DEVICE FOR SEALING SHAFT BEARINGS OR SHAFT BEARING HOUSINGS

[75] Inventors: Helmut Senft; Peter Hasenrath, both of Graz, Austria

[73] Assignee: Maschinenfabrik Andritz Actiengesellschaft, Graz, Austria

[21] Appl. No.: 99,456

[22] Filed: Sep. 21, 1987

[30] Foreign Application Priority Data

Sep. 24, 1986 [AT] Austria ................ 2551/86

[51] Int. Cl.$^4$ ............................................. F02F 11/00
[52] U.S. Cl. ................................. 277/53; 384/486; 384/489
[58] Field of Search ............... 277/53, 25, 165, 68; 384/484, 486, 488, 489

[56] References Cited

U.S. PATENT DOCUMENTS

| | | | |
|---|---|---|---|
| 3,550,974 | 12/1970 | Kupchick | 384/480 |
| 3,770,991 | 11/1973 | Ladin | 384/484 |
| 3,770,993 | 11/1973 | Shultenkamper | 384/484 |
| 4,093,324 | 6/1978 | Carrigan | 384/480 |
| 4,304,409 | 12/1981 | Orlowski | 277/53 |
| 4,348,067 | 9/1982 | Tooley | 384/480 |
| 4,611,931 | 9/1986 | Brandenstein | 384/484 X |

Primary Examiner—Harvey C. Hornsby
Assistant Examiner—K. O'Leary
Attorney, Agent, or Firm—Beveridge, DeGrandi & Weilacher

[57] ABSTRACT

The invention relates to a device for sealing shaft bearings or shaft bearing housing, in particular of self-aligning roller bearings for prepressing rollers or the like, having a special ring or special sleeve which surrounds the shaft, is advantageously made of stainless steel and has on the outer circumferential surface at least one annular projection which extends into at least one annular groove at at least one end of the bearing housing. According to the invention the concern here is primarily to inexpensively develop bearing housings, in particular production bearing housings, for operating conditions with exacting requirements on the sealing of the bearing. According to the invention this is mainly achieved when the annular projection or projections (7) of the special ring or special sleeve (2) inserted in the housing (1) and enclosing the shaft with sealed (3') clearance are fitted into the housing groove(s) (10) for the standard seal(s) (6) of production bearing housings (1), and when at least one, expediently two annular recesses (3) for a radial lip seal(s) (3') are provided on the inner circumferential surface (9), preferably on the front end(s) (11,12) of the special ring or special sleeve (2).

27 Claims, 2 Drawing Sheets

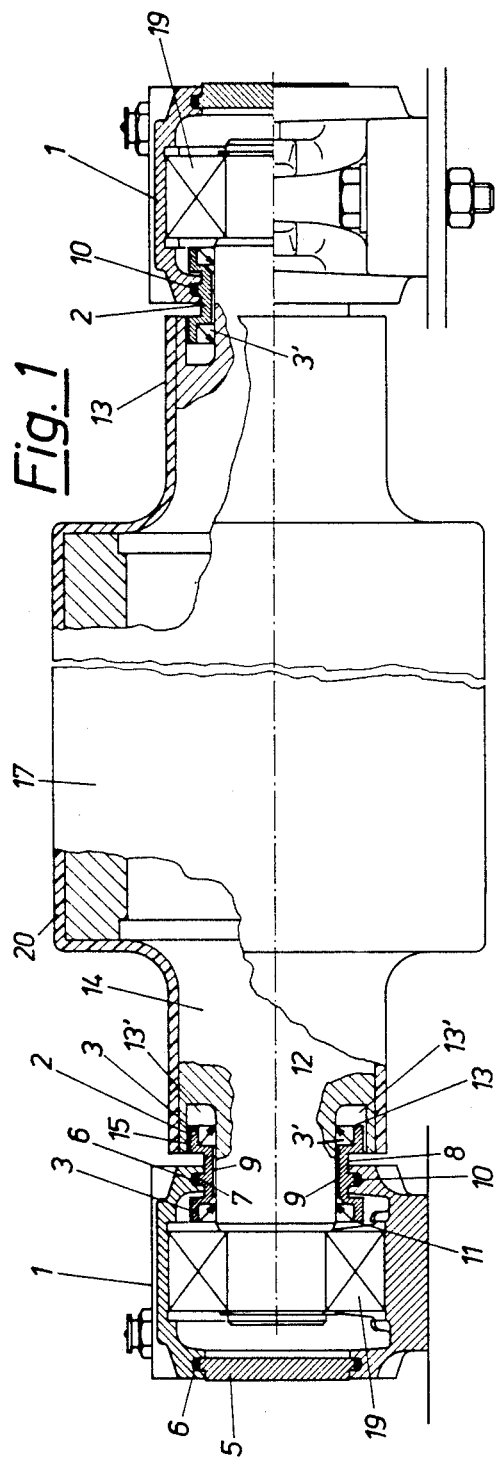
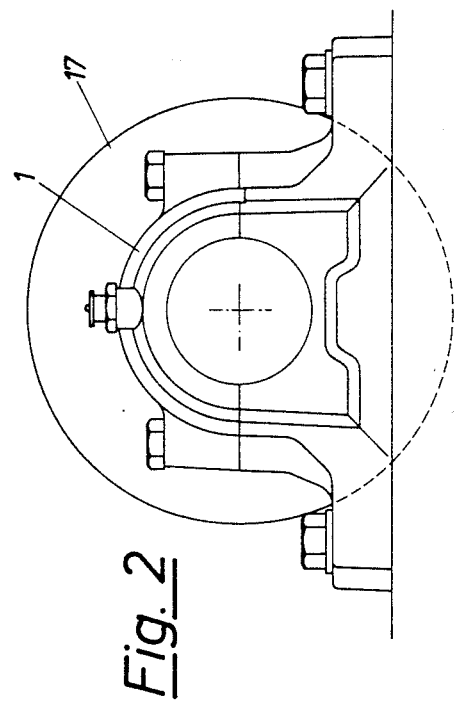

DEVICE FOR SEALING SHAFT BEARINGS OR SHAFT BEARING HOUSINGS

The invention relates to a device for sealing shaft bearings or shaft bearing housings, in particular of self-aligning roller bearings for prepressing rollers or the like, having a special ring or special sleeve which surrounds the shaft, is advantageously made of stainless steel and has on the outer circumferential surface at least one annular projection which extends into at least one annular groove at at least one end of the bearing housing. According to the invention, the concern here is primarily to inexpensively develop bearing housings, in particular production bearing housings, for operating conditions with exacting requirements on the sealing of the bearing. The main object of the invention is on the one hand to use production self-aligning roller bearings, which are very moderately priced, for prepressing rollers, e.g. in double endless-belt screen presses or the like, or to adapt them to such installations, and on the other hand, despite difficult operating conditions, to increase the working time of such inexpensive production bearings. Moreover, such a modification or adaption of the production bearings is to be made possible simply and without a crucial amount of labour and material. However, it is not sufficient as a rule to merely replace the conventional bearing seals by such seals of higher quality and longer life.

The aims described above can be achieved in a device for sealing bearings of the type described at the beginning when the annular projection of projections of the special ring or special sleeve inserted in the housing and enclosing the shaft with sealed clearance are fitted into the housing groove(s) for the standard seal(s) for production bearing housings, and when at least one, expediently two, annular recess(es) for a radial lip seal(s) are provided on the inner circumferential surface, preferably on the front end(s) of the special ring or the special sleeve. Such special rings or special sleeves can easily be inserted into the split bearing housings, it only being necessary, with regard to the space requirement of these special rings or sleeves, to select bearing housings or housing caps with larger openings for the shaft or roller neck to be mounted. For the use of the device according to the invention, the annular projection or projections are therefore fitted into the housing groove(s) for the standard seal(s) of production bearing housings. In order to keep down the weight of the special ring or the special sleeve and accordingly to minimise the material requirement for this, it is favourable if, in the area of the recesses for the radial lip seals, the diameter of the outer circumferential surface of the special ring or the special sleeve is larger than next to the annular projection or projections so that, as viewed in axial section, the special ring or special sleeve forms a step in the transition from its centre part to its end part(s).

The sealing effect can be improved still further if, for the purpose of forming a labyrinth seal, one front end of the special ring or the special sleeve extends into an annular recess in the end area of the shaft, in particular the roller neck, widened outside the housing of the bearing, which annular recess is advantageously formed partly by means of a further sleeve drawn on to the shaft, in particular the roller neck, and partly in the shaft or the roller neck itself, with the outer circumferential surface of the special ring or the special sleeve and the recess or the inner circumferential surface of the second mentioned sleeve forming a labyrinth gap in this area. This can be effected practically in such a way that the further sleeve, at the front end and therefore in the area of the special ring or special sleeve extending in at this location, is recessed in an annular shape on the inner circumferential surface.

If a simple embodiment is desired, the bearing-side front end of the step of the end part of the special ring or the special sleeve, which end part is located outside the bearing housing, will be in alignment with the bearing-side front end of the widened shaft, in particular of the roller neck, e.g. of the prepressing roller or the like. The penetration of water, the diverse treatment media or the like into the bearing and even into the labyrinth seal can be additionally impeded if the bearing-side front end of the step of the end part of the special ring or special sleeve, which end part is located outside the bearing housing, is set back relative to the bearing-side front end of the widened shaft, in particular of the roller neck, e.g. of the prepressing roller or the like. This inhibiting effect is intensified if, according to a further inventive variant, the shaft, in particular the roller neck, widened outside the bearing housing, additionally has at its end facing the bearing housing an annular widened portion on its outer circumferential surface.

The bearing cap and the special ring or the special sleeve according to the invention can be sealed toward the inside of the bearing housing by O-rings known per se, the O-ring for the special ring being arranged between the annular projection and the base of the housing groove accommodating it.

Exemplary embodiments of the invention are described with reference to the drawing.

FIG. 1, partly in side view and—in particular in the area of the bearings—partly in longitudinal section, shows a prepressing roller which is supported in self-aligning roller bearings developed according to the invention.

FIG. 2, represents an end elevation hereto.

Figure 3:
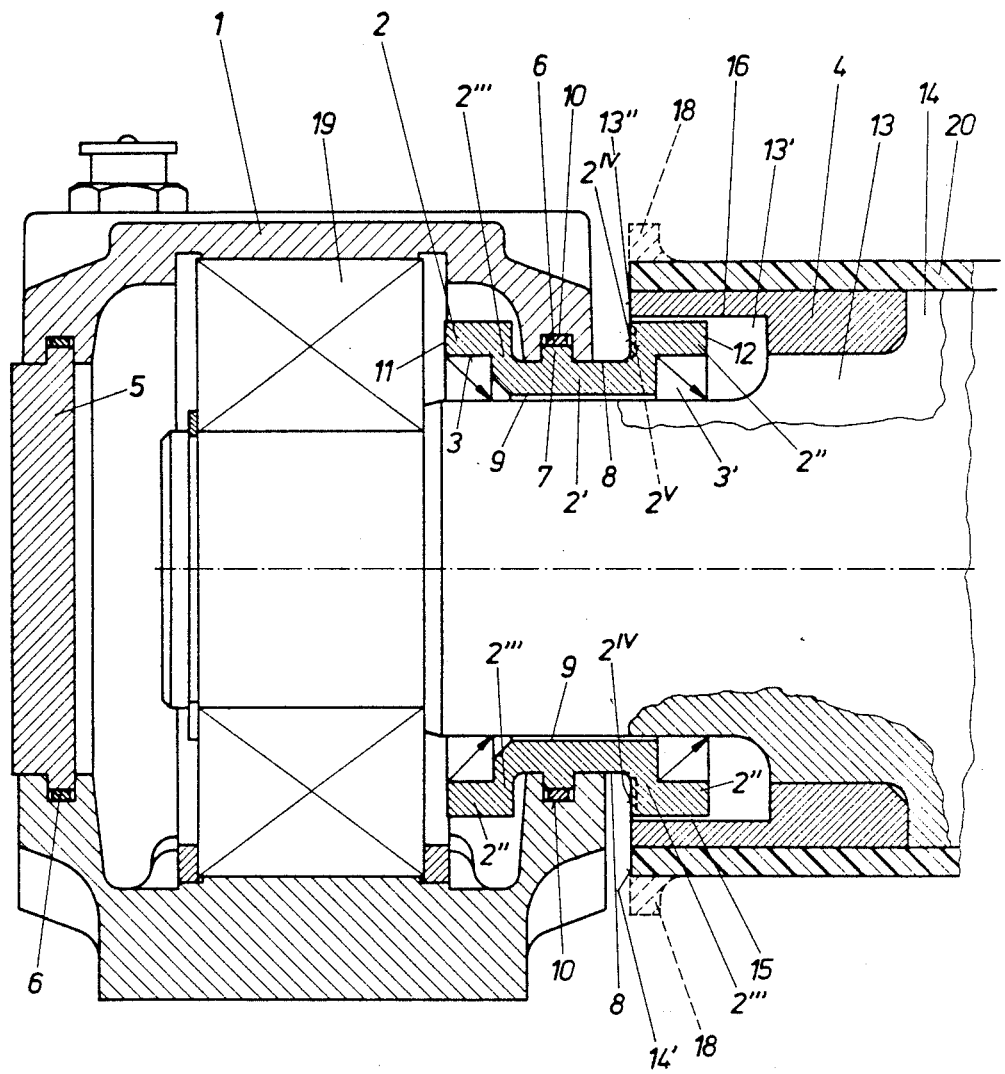
FIG. 3, illustrates, in an enlarged scale hereto and in longitudinal section, several variants of the bearing arrangement according to the invention.

As FIGS. 1 and 2 first of all show, the devices according to the invention are provided for sealing bearings or bearing housings, for example for self-aligning roller bearings 19 for prepressing rollers 17. The bearing housings 1 are of conventional split construction, as revealed in particular by FIG. 2. According to the invention, the main concern here is to provide production bearing housings 1 with a very good seal. For this purpose, a special ring or a special sleeve 2 with at least one annular projection 7 on the outer circumferential surface 8 and at least one, expediently two annular recesses 3 for a radial lip seal(s) 3' on the inner circumferential surface 9 is inserted into the production bearing housing 1, as shown by FIG. 1 and, in an enlarged scale thereto, by FIG. 3. At the same time, the abovementioned projection or projections 7 extend into at least one annular groove 10 at at least one end of the bearing housing, and this recess or recesses 3 are provided on the front end(s) 11,12 of this special ring. It should be especially emphasized that the annular projection or projections 7 are fitted into the housing groove(s) 10 for the standard seal(s) 6 of production bearing housings 1. The special ring or the special sleeve 2 is advantageously shaped in such a way that, in the area of the recesses 3 for the radial lip seals 3', the diameter of the outer circumferential surface 8 of the special ring or the special sleeve 2 is larger than next to the annular projection or projections 7 so that, as viewed in axial section, the special ring or special sleeve 2 forms a step 2''' in the transition from its centre part 2' to its end part(s) 2''. Thus adequate space is created for sound or effective seals 3' without the circumferential surface of the special rings 2 having to be made thick, which results not only in advantages with regard to the expenditure but also with regard to the space requirement for the special ring, or it enables the bearing size or the bearing diameter to be kept sufficiently small.

The special bearing sealing according to the invention, during the operation of the prepressing rollers or the like 17, serves to shield in a particularly efficient manner self-aligning roller bearings 19 or the like or to shield the inside of their bearing housings 1 and the oil or lubricant or bearing grease located therein in particular from the water, treatment agent, etc. passing from the endless-belt screen or other conveying device, which is guided by the prepressing roller 17 or the like, to the bearing (housing) or the roller neck 14. This effect is increased if, for the purpose of forming a labyrinth seal, one front end 12 of the special ring 2 extends into an annular recess 13' in the end area 13 of the shaft, in particular the roller neck 14, widened outside the housing 1 of the bearing, which annular recess 13' is advantageously formed partly by means of a sleeve 4 drawn onto the shaft, in particular the roller neck, and partly in the shaft or the roller neck 14 itself, with the outer circumferential surface of the special ring and the recess 13' of the inner circumferential surface of the sleeve 4 forming a labyrinth gap 15 in this area. FIG. 1 shows an embodiment in this respect with a recess 13' arranged directly in the widened shaft or in the widened roller neck. In contrast, FIG. 3 represents a variant with the drawn-on sleeve 4, a design which can be preferred for reasons of manufacture. In this case, the sleeve 4, at the front end and therefore in the area of the special ring 2 extending in at this location, is expediently recessed in an annular shape 16 on the inner circumferential surface.

As shown in particular by FIG. 3 by solid lines, the bearing-side front end $2^{IV}$ of the step 2''' of the end part 2'' of the special ring o the special sleeve 2, which end part 2'' is located outside the bearing housing 1, can be in alignment with the bearing-side front end 13' of the widened shaft, in particular of the roller neck 14, e.g. of the prepressing roller or the like 17. In many cases, however, better protection is achieved, in particular protection against corrosion, for the seal and the bearing or bearing housing if the bearing-side front end $2^V$ of the step 2''' of the end part 2'' of the special ring or special sleeve 2, which end part 2'' is located outside the bearing housing 1, is set back relative to the bearing-side front end 13'' of the widened shaft, in particular of the roller neck 14, e.g. of the prepressing roller or the like 17. This design is indicated by a broken line in FIG. 3.

Washing liquid, e.g. washing water, chemicals, fibrous materials and other materials, etc., to be treated which could pass from the endless-belt screen or the like to the bearing are additionally shielded according to the further development of the invention if the shaft, in particular the roller neck 14, widened outside the bearing housing 1, has at its end 14' facing the bearing housing 1 an annular widened portion 18 on its outer circumferential surface. This variant, too, is shown by a broken line in FIG. 3.

The special ring or the special sleeve 2 is expediently made of stainless steel. The invention enables on the one hand production bearings, in particular production self-aligning roller bearings, which are very moderately priced, to be used for prepressing rollers, e.g. in double endless-belt screen presses or the like, or enables them to be adapted to such installations, and on the other hand, despite difficult operating conditions, it enables the working time of such inexpensive production bearings to be increased. The surface of the prepressing roller is here provided with a coating 20 made, for example, of plastic. This coating can also be omitted, in particular if the roller is made of an appropriately resistant alloy.

As the representations (FIG. 1 and FIG. 3) further show, the annular projection or projections 7 of the special ring or special sleeve 2, in particular in the housing groove or housing grooves 10, can be sealed by an O-ring 6 or the like which is arranged in particular between the outer circumferential surface of the annular projection 7 and the inner circumferential surface of the housing groove 10, it being possible for the bearing cap 5 to be sealed in the same way.

We claim:
1. A sealing bearing assembly for a shaft, comprising,
 a bearing housing which has, at one end thereof, an annular groove with a bottom surface,
 a first sleeve which surrounds and is immediately mounted on the shaft with a sealed clearance between the first sleeve and the shaft, said first sleeve being inserted in said bearing housing, said first sleeve having an outer circumferential surface provided with an annular projection which is fitted into the groove of the bearing housing, said projection being spaced from the bottom of the groove to provide a space, an annular seal in the space between the projection and the bottom of the groove, said first sleeve having at least one end with an inner circumferential surface provided with an annular recess, and a radial lip seal in said annular recess of the first sleeve, said first sleeve having at least one end portion that has a greater diameter than the portion that is beside the annular projection whereby, progressing in an axial direction, the first sleeve forms a step from its center toward its end, said shaft having an end area provided with an annular recess for forming a labyrinth seal, said first sleeve having an end which extends into the annular recess of the shaft and is formed to define a labyrinth gap between the first sleeve and shaft.

2. A sealing bearing assembly for a shaft according to claim 1 wherein the shaft includes a main body and a second sleeve which is affixed to the main body of the shaft, said labyrinth gap lying between the second sleeve, the first sleeve, and the recess in the end area of the shaft.

3. A sealing bearing assembly for a shaft according to claim 2 wherein the second sleeve has an annular internal recess forming a surface which radially faces the first sleeve at the labyrinth gap.

4. A sealing bearing assembly for a shaft according to claim 1 wherein the step is located outside the bearing housing, and the shaft has an axially facing surface which is aligned with said step.

5. A sealing bearing assembly for a shaft according to claim 1 wherein the step is located outside the bearing housing, and the shaft has an axially facing surface which extends axially beyond the step, whereby the step is set back relative to the axially facing surface of the shaft.

6. A sealing bearing assembly for a shaft according to claim 1 wherein the shaft has an annular widened portion which faces the bearing housing and is located outside the bearing housing.

7. A sealing bearing assembly for a shaft according to claim 1 wherein the annular seal is an O-ring.

8. A sealing bearing assembly for a shaft according to claim 1 wherein the bearing housing has a bearing cap with an annular projection on its outer circumferential surface, said bearing housing having an annular groove which receives the annular projection of the cap, and an O-ring seal located between an outer circumferential surface of the annular projection of the cap and an inner circumferential surface of the annular groove in the bearing housing.

9. A sealing bearing assembly for a shaft, comprising,
   a bearing housing which has, at one end thereof, an annular groove with a bottom surface,
   a first sleeve which surrounds and is immediately mounted on the shaft with a sealed clearance between the first sleeve and the shaft, said first sleeve being inserted in said bearing housing, said first sleeve having an outer circumferential surface provided with an annular projection which is fitted into the groove of the bearing housing, said projection being spaced from the bottom of the groove to provide a space, an annular seal in the space between the projection and the bottom of the groove, said first sleeve having at least one end with an inner circumferential surface provided with an annular recess, and a radial lip seal in said annular recess, said shaft having an end area provided with an annular recess for forming a labyrinth seal, said first sleeve having an end which extends into the annular recess of the shaft and is formed to define a labyrinth gap between the first sleeve and shaft.

10. A sealing bearing assembly for a shaft according to claim 9 wherein the shaft includes a main body and a second sleeve which is affixed to the main body of the shaft, said labyrinth gap lying between the second sleeve, the first sleeve, and the recess in the end area of the shaft.

11. A sealing bearing assembly for a shaft according to claim 9 wherein the first sleeve has at least one end portion that has a greater diameter than the portion that is beside the annular projection whereby, progressing in an axial direction, the first sleeve forms a step from its center toward its end.

12. A sealing bearing assembly for a shaft according to claim 11 wherein the step is located outside the bearing housing, and the shaft has an axially facing surface which is aligned with said step.

13. A sealing bearing assembly for a shaft according to claim 11 wherein the step is located outside the bearing housing, and the shaft has an axially facing surface which extends axially beyond the step, whereby the step is set back relative to the axially facing surface of the shaft.

14. A sealing bearing assembly for a shaft according to claim 11 wherein the shaft has an annular widened portion which faces the bearing housing and is located outside the bearing housing.

15. A sealing bearing assembly for a shaft according to claim 11 wherein the annular seal is an O-ring.

16. A sealing bearing assembly for a shaft according to claim 11 wherein the bearing housing has a bearing cap with an annular projection on its outer circumferential surface, said bearing housing having an annular groove which receives the annular projection of the cap, and an O-ring seal located between an outer circumferential surface of the annular projection of the cap and an inner circumferential surface of the groove in the bearing housing.

17. A sealing bearing assembly for a shaft according to claim 9 wherein the second sleeve has an annular internal recess forming a surface which radially faces the first sleeve at the labyrinth gap.

18. A sealing bearing assembly for a shaft, comprising,
    a bearing housing which has, at one end thereof, an annular groove with a bottom surface,
    a first sleeve which surrounds and is immediately mounted on the shaft with a sealed clearance between the first sleeve and the shaft, said first sleeve being inserted in said bearing housing, said first sleeve having an outer circumferential surface provided with an annular projection which is fitted into the groove of the bearing housing, said projection being spaced from the bottom of the groove to provide a space, an annular seal in the space between the projection and the bottom of the groove, said first sleeve having at least one end with an inner circumferential surface provided with an annular recess, and a radial lip seal in said annular recess.

19. A sealing bearing assembly for a shaft according to claim 18 wherein the first sleeve has at least one end portion that has a greater diameter than the portion that is beside the annular projection whereby, progressing in an axial direction, the first sleeve forms a step from its center toward its end.

20. A sealing bearing assembly for a shaft according to claim 19 wherein the step is located outside the bearing housing, and the shaft has an axially facing surface which is aligned with said step.

21. A sealing bearing assembly for a shaft according to claim 19 wherein the step is located outside the bearing housing, and the shaft has an axially facing surface which extends axially beyond the step, whereby the step is set back relative to the axially facing surface of the shaft.

22. A sealing bearing assembly for a shaft according to claim 18 wherein the shaft has an end area provided with an annular recess for forming a labyrinth seal, said first sleeve having an end which extends into the annular recess of the shaft and is formed to define a labyrinth gap between the first sleeve and shaft.

23. A sealing bearing assembly for a shaft according to claim 22 wherein the shaft includes a main body and a second sleeve which is affixed to the main body of the shaft, said labyrinth gap lying between the second sleeve, the first sleeve, and the recess in the end area of the shaft.

24. A sealing bearing assembly for a shaft according to claim 23 wherein the second sleeve has an annular internal recess forming a surface which radially faces the first sleeve at the labyrinth gap.

25. A sealing bearing assembly for a shaft according to claim 18 wherein the shaft has an annular widened portion which faces the bearing housing and is located outside the bearing housing.

26. A sealing bearing assembly for a shaft according to claim 18 wherein the annular seal is an O-ring.

27. A sealing bearing assembly for a shaft according to claim 18 wherein the bearing housing has a bearing cap with an annular projection on its outer circumferential surface, said bearing housing having an annular groove which receives the annular projection of the cap, and an O-ring seal located between an outer circumferential surface of the annular projection of the cap and an inner circumferential surface of the groove in the bearing housing.

* * * * *